Feb. 21, 1933.   B. F. ODOM   1,898,849
TURPENTINE TIN AND NAIL PULLER
Filed July 28, 1930
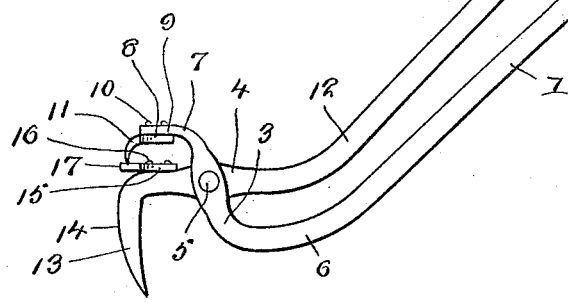
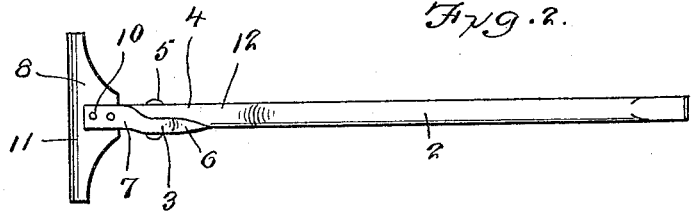
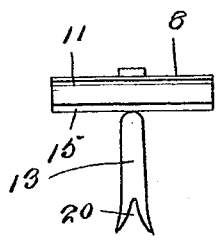
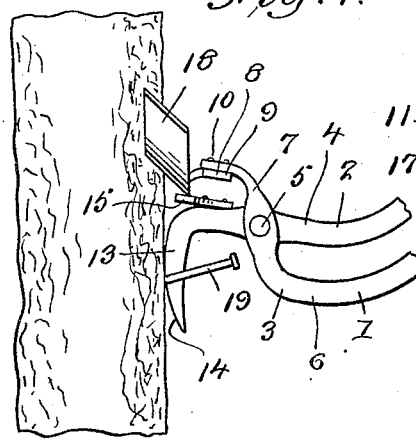
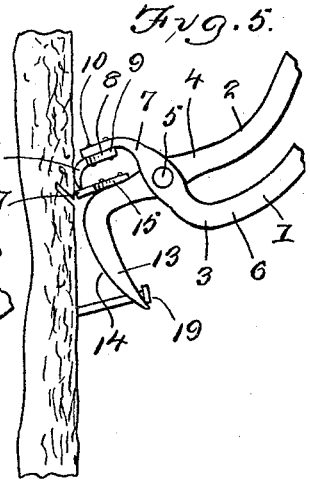
B. F. Odom, INVENTOR
BY Victor J. Evans, ATTORNEY Patented Feb. 21, 1933

1,898,849

UNITED STATES PATENT OFFICE

BURRELL FRED ODOM, OF HAZELHURST, GEORGIA

TURPENTINE TIN AND NAIL PULLER

Application filed July 28, 1930. Serial No. 471,291.

This invention relates to a tool for employment by workmen in applying collecting tins and nails to tree trunks from which turpentine is to be collected, the nails serving to support a cup in such position with respect to the tin as to collect the turpentine. After the turpentine has been collected from the trees, it becomes necessary to remove the tins and nails in order to place them higher on the trees for further extraction of turpentine after a period of one or more years, and up to the present time, it has been customary to employ two men, one using an ax to chop out the tree trunk about the tin to remove the same, while another workman is provided with a nail pulling bar to remove the nails. In view of the foregoing, the invention has as its primary object to provide a single tool capable of being employed by one workman for the purpose of extracting tins and nails from tree trunks so that they may be ready for collection at the time of extraction or later. Therefore, the invention contemplates a tool which will be found of great value in removing tins and nails from turpentine trees where leases have expired or where the timber will be allowed to stand idle and grow for awhile, as the removal of tins and nails will allow natural and unrestricted growth.

Another object of the invention is to provide, in a single tool of this type, embodying a pair of crossed pivoted hand levers, means upon the forward ends of the levers for gripping a tin, when the levers are swung together, so that the tin may be conveniently removed by a simple movement of both levers together, the invention having as a further object to provide one of the levers with a member which constitutes an abutment which may be brought to bear against the trunk of the tree at the time of removal of the tin therefrom, and to further simplify and facilitate the work involved by providing this member with a notch which is engageable with the ordinary nail employed so that the single tool may be employed for both purposes.

This invention also consists in certain other features of construction and in the combination and arrangement of the several parts, to be hereinafter fully described, illustrated in the accompanying drawing, and specifically pointed out in the appended claims, it being understood of course that minor changes may be made so long as they fall within the scope of the claims.

In describing my invention in detail, reference will be had to the accompanying drawing, wherein like characters denote like or corresponding parts throughout the several views, and in which:

Figure 1 is a view in side elevation of the tool embodying the invention.

Figure 2 is a top plan view thereof.

Figure 3 is a view in front elevation of the tool.

Figure 4 is a fragmentary view in side elevation illustrating the manner in which the tool is to be employed in removing a tin from the tree trunk.

Figure 5 is a similar view illustrating the manner in which a nail may be removed.

The tool embodying the invention comprises a pair of hand levers, one indicated by the numeral 1 and the other by the numeral 2, and these levers are provided with intersecting portions 3 and 4 respectively, through which a pivot pin 5 is secured, so that the levers are connected with each other for relative pivotal movement. It will be evident that these members may be formed from bar metal at a low cost of manufacture and, in forming the member, the member of lever 1 has for its forward end portion provided with a bend 6 which is curved upwardly and forwardly to provide the intersecting portion 3 and, beyond this portion the lever is extended in a forward direction as indicated by the numeral 7 and flattened, and the gripping plate 8 is formed to provide an attaching portion 9 which is riveted or otherwise secured as at 10 to the under side of the flattened forward end of the portion 7 of the lever 1.

This plate 8 is curved from its attaching portion 9 forwardly and downwardly as indicated by the numeral 11. The lever 2 is provided with a bend 12 located opposite the bend 6 in the lever 1 but of less length and less curvature than the said bend 6 so that the intersecting portion 4 of this lever is substantially straight. However, this portion 4 of the lever 2 is provided with a downwardly extending abutment extension 13 the forward edge of which is curved as indicated by the numeral 14. A flat grip plate 15 is disposed upon the upper side of the intersecting portion 4 of the hand lever 2 at the forward end of said portion and secured thereto by rivets or otherwise by fastening means 16 and this plate has a forward extension 17 which extends below the lower edge of the curved portion 11 of the plate 8. By reference to Figure 1 of the drawing it will be observed that when the hand levers 1 and 2 are brought together, substantially in the manner shown in Figure 1, the lower edge of the portion 11 of the plate 8 will be in contact with the upper side of the portion 17 of the plate 15.

In view of the foregoing and by reference to Figure 4, it will be understood that when it is desired to remove, from the trunk of a tree, the usual tin, which is indicated by the numeral 18, and which is ordinarily employed for catching and delivering, to a cup, turpentine, flowing onto the tin, it is only necessary to partly separate the hand gripped portions of the hand levers 1 and 2 and apply the tool to the tin 18 by engaging the overturned portion 11 of the clamping member 8 against the upper side of the tin near the forward edge thereof, and then swinging the handle gripped portions of the lever toward each other so as to bring the upper side of the portion 17 of the plate 15 into gripping engagement with the under side of the tin 18.

At this time the rounded edge 14 of the extension 13 will be in engagement with the tree trunk as shown in Figure 4 and consequently by pressing together the hand gripping portions of the levers 1 and 2, the gripping portions of the levers will be caused to firmly grip the tin 18 and, when downward swinging movement is imparted to the tool as a whole, a pull will be exerted upon the tin to extract it from engagement in the trunk of the tree.

After using the tool, in the manner recited above, it is desirable to employ the same in extracting the large nail 19 which is ordinarily driven into the tree trunk below the tin 18 to support a cup (not shown) into which the turpentine may drain from the tin 18 and with this end in view the invention contemplates forming the lower end of the extension 13 with a V-shaped notch 20 which may be engaged with the nail 19 in the manner clearly shown in Figure 5 of the drawing and, at this time, the curved portion 11 of the plate 8 will be in engagement against the tree trunk and an upward swinging movement of the hand levers 1 and 2 will serve to extract the nail 9.

What I claim is:

1. A tool of the character described comprising a pair of crossed pivoted levers, the corresponding extremities of said levers adjacent their pivot being disposed in superimposed relation, horizontally arranged relatively wide gripping plates secured to the confronting faces of said extremities and projecting beyond the sides thereof, and an abutment extension projecting downwardly from one of said extremities at a right angle thereto and having its outer surface curved to provide a fulcrum for the tool.

2. A tool of the character described comprising a pair of crossed pivoted levers, the corresponding extremities of said levers adjacent their pivot being arranged in spaced superimposed relation, horizontally disposed relatively wide gripping plates secured to the confronting faces of said extremities and projecting beyond the sides thereof, the forward edge of one plate being curved outwardly and downwardly to contact the upper surface of the adjacent plate when the levers are moved toward each other, and an abutment extension projecting downwardly from one of said extremities at a right angle thereto and having its outer surface curved to form a fulcrum for the tool.

In testimony whereof I affix my signature.

BURRELL FRED ODOM.